UNITED STATES PATENT OFFICE.

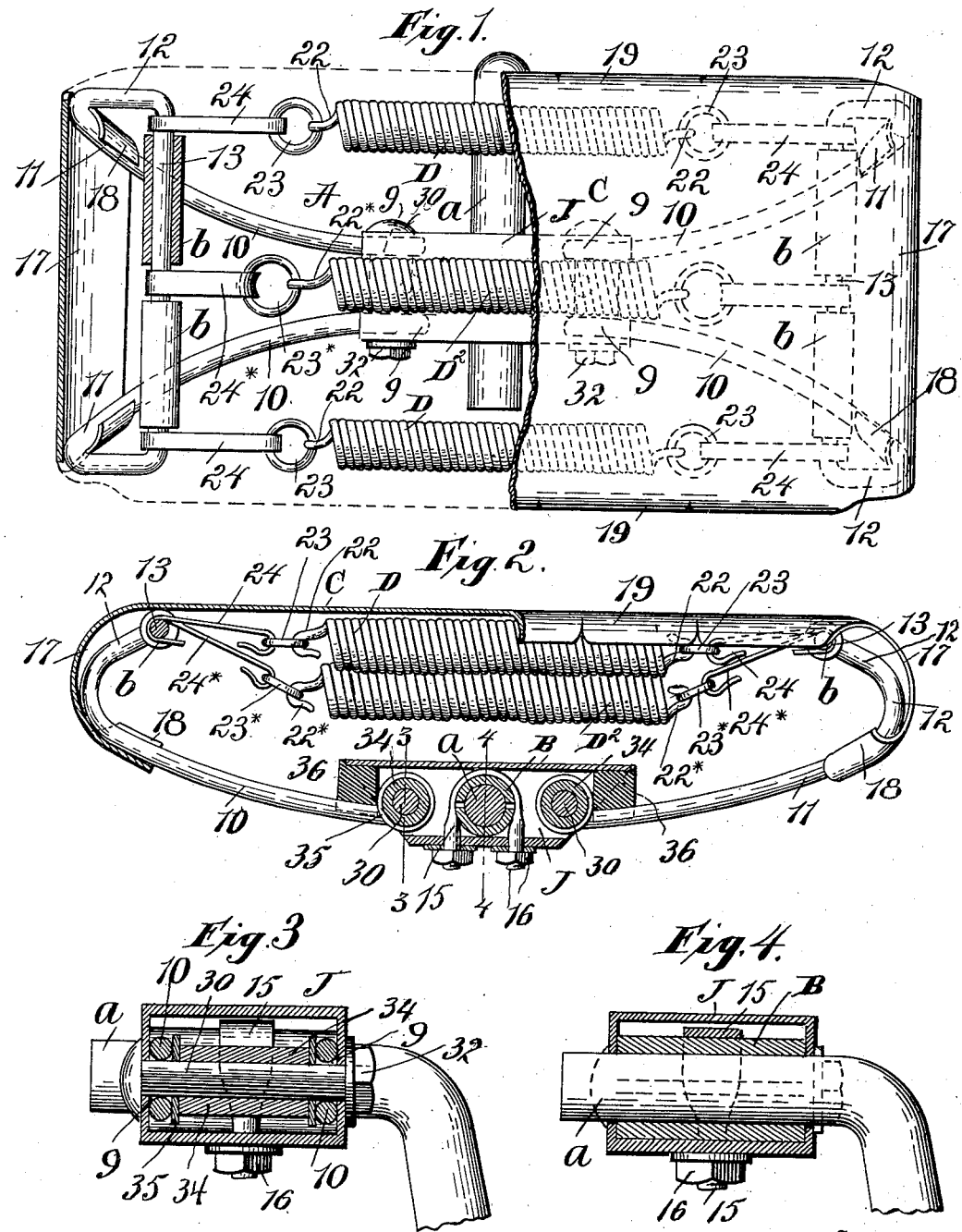

EVERETT W. WALKER, OF SPRINGFIELD, MASSACHUSETTS.

SEAT FOR BICYCLES, &c.

SPECIFICATION forming part of Letters Patent No. 660,132, dated October 23, 1900.

Application filed February 12, 1900. Serial No. 4,867. (No model.)

*To all whom it may concern:*

Be it known that I, EVERETT W. WALKER, a citizen of the United States of America, and a resident of Springfield, in the county of Hampden and State of Massachusetts, have invented certain new and useful Improvements in Seats for Bicycles and other Vehicles, of which the following is a full, clear, and exact description.

This invention relates to improvements in seats for bicycles, tricycles, motor-carriages, and other vehicles.

The object of this invention is to provide a seat of improved construction, which is above all extremely comfortable and especially adapted for use by ladies and more mature and also heavy riders, to whom ease and comfort are given precedence over all else.

The invention consists in constructions and combinations of parts, all substantially as hereinafter fully described, and set forth in the claims.

My improved saddle is illustrated in the accompanying drawings, in which—

Figure 1 is a plan view of the seat or saddle with a portion of the seat-top removed for clearer illustration of the parts therebelow. Fig. 2 is a rear elevation with some parts in vertical cross-section. Fig. 3 is a sectional view in detail taken on the line 3 3, Fig. 2; and Fig. 4 is a sectional view in detail taken on the line 4 4, Fig. 2.

Similar characters of reference indicate corresponding parts in all of the views.

In the drawings, A represents the saddle or seat frame, comprising the opposite pair of bowed or upwardly-curving members 10 10, the same being divergent at the opposite ends of the frame, as shown in Fig. 1, the upwardly-extending portion at the ends of the members 10 10 being inwardly continued a short distance in the section designated by 12 12, which are united by the transverse members 13, and the seat-frame is composed of duplicated halves, each of which is constituted by a single length of heavy and comparatively stiff wire, the under-turned and approached extremities of which are formed into eyes 9 9.

$a$ represents the seat-post arm, which ranges forward and rearwardly on the bicycle or other vehicle, but transversely relatively to the length of the seat, and B represents a split clamping-sleeve inclosed in the metallic box-like appliance J, said clamping-sleeve embracing the seat-post arm $a$ and confined thereto and the seat-post arm and sleeve connected to the part J by the clip 15, on the threaded extremities of which are the confining-nuts 16.

The opposite vertical walls of the box-like fitting J support the bolts 30 30, which are arranged in parallelism with each other and with the arm $a$, these bolts having each a head at one end and a nut 32 at the other, and they form the members for the pivotal connection therewith of the eye-formed ends 9 9 of the heavy wire duplicated members, which constitute together the saddle-frame.

Sleeves or tubular distance-blocks 34, with washers 35 of increased diameter, are interposed between the eye-formed ends of each half of the saddle-frame for keeping these parts in their proper places on the supporting-bolts therefor.

36 36 represent blocks of any suitable material—as, for instance, rubber or wood—interposed between the portions 10 of the wire seat-frame which are adjacent the eyes 9 and the top of the case-like fitting J, serving to prevent an undue upward drawing or swinging of the aforementioned wire-formed part.

C represents the seat-top, the same being preferably constructed of a comparatively wide blank of sheet metal, supported by the cross members 13 13 of the frame and having its opposite end portions 17 17 turned around and partially under the curved extremities of the frame and provided with the ears 18, which engage the adjacent portions of the said heavy wire frame and prevent the displacement of the said seat-top.

The opposite edges of the seat-top are downwardly turned on curving contours, as indicated at 19. This renders the top substantially rigid between its points of support on the seat-frame.

Rollers $b$ $b$ are placed to rotate upon the transverse members 13 13 of the seat-frame and directly support the seat-top.

D D represent a pair of horizontally-arranged spiral springs, having the end eyes 22, engaged with which are the rings 23, and engaged both with the rings 23 and the transverse upper seat members 13 are the links 24, such links, rings, and the intermediately-connected spiral springs D being normally taut or substantially so. An intermediate spiral spring $E^2$ is also provided, the same having end eyes 22*, connecting-rings 23* and links 24* being also provided, whereby the said spring is held in suspension under the central longitudinal line of the seat, the said latter appliances, as indicated in Fig. 2, not being taut, but normally sagging somewhat below the seat-top C.

The weight of the rider on the seat causes the duplicated parts made of the heavy wire which constitute the seat-frame and which have pivotal support at 9 9 to swing downwardly and outwardly on such pivots as the center of motion, and this spreading of the seat-frame is against the resistance not only of the spring D D, which becomes stretched, but also of the curved under-turned extremities 17 17 of the metallic seat-top, for it will be understood that the curved portions 11 11 of the seat-frame in bearing against the said under-turned portion of the metallic seat develop a gradually-increasing pressure between these parts.

The rollers $b\ b$, provided on the portions 13 of the seat-frame, render more easy and free the operation described and also tend to obviate scraping or squeaking noises.

The intermediate spring $D^2$, which may advantageously be made somewhat heavier and stiffer than the springs D D, is relied upon to supplement and reinforce the latter springs, rendering the seat sufficiently stiff and strong to withstand the maximum weight which may ever be brought upon the seat.

The top of the seat may be left plain or it may be covered with leather, cloth, or upholstered in accordance with individual desire.

Having thus described my invention, what I claim, and desire to secure by Letters Patent, is—

1. A seat for bicycles, or other vehicles consisting of a bowed and upwardly-open seat-frame, the opposite portions 11, 11, thereof being upwardly and outwardly inclined and composed of duplicated halves, the lower portions of which are pivotally supported, and a seat-top having the downturned portions 17, 17, in bearing on the said seat-frame portions 11, 11, and provided with the engaging ears 18, 18, said top being supported on the opposite upper portion of said frame and spanning the space therebetween, substantially as described.

2. A seat for bicycles or other vehicles consisting of a bowed and upwardly-open seat-frame, the opposite portions 11, 11, thereof being upwardly and outwardly inclined, and a seat-top having the downturned portions 17, 17, bearing on the portions 11, 11, and provided with the engaging ears 18, 18, said top being supported on the extremities of said frame, and extending across or spanning the space between said extremities, substantially as described.

3. In a seat for vehicles, the seat-frame composed of duplicated halves, each consisting of a single length of wire comprising the intermediate section 13, the sections 12, 12, the under-turned portions 11, 11, and the bowed extremities 10, 10, terminating in the eyes 9, a common support with which the eyes have pivotal connection as described, one or more spiral springs between and connected to the oppositely-arranged parts 13, 13, of both the seat-frame counterparts and the seat-top, substantially as described.

Signed by me at Springfield, Massachusetts, this 9th day of February, 1900.

EVERETT W. WALKER.

Witnesses:
WM. S. BELLOWS,
M. A. CAMPBELL.